US011337545B1

(12) United States Patent
Davies et al.

(10) Patent No.: US 11,337,545 B1
(45) Date of Patent: May 24, 2022

(54) FLUID MIXTURE DISPENSING DEVICE

(71) Applicant: Cana Technology, Inc., Redwood City, CA (US)

(72) Inventors: Andrew Scott Davies, Oakland, CA (US); Gregory Allen Springer, Los Altos, CA (US); Kristopher Bernardo Dos Santos, San Francisco, CA (US); Matthew Ambauen, San Francisco, CA (US)

(73) Assignee: Cana Technology, Inc., Redwood City, CA (US)

( * ) Notice: Subject to any disclaimer, the term of this patent is extended or adjusted under 35 U.S.C. 154(b) by 0 days.

(21) Appl. No.: 17/550,730

(22) Filed: Dec. 14, 2021

(51) Int. Cl.
*A47J 31/44* (2006.01)
*A47J 31/41* (2006.01)
*A47J 31/60* (2006.01)
*A47J 31/46* (2006.01)
*A47J 31/40* (2006.01)

(52) U.S. Cl.
CPC .......... *A47J 31/446* (2013.01); *A47J 31/407* (2013.01); *A47J 31/41* (2013.01); *A47J 31/468* (2018.08); *A47J 31/60* (2013.01)

(58) Field of Classification Search
CPC ...... A47J 31/446; A47J 31/468; A47J 31/407; A47J 31/41; A47J 31/60
USPC .................. 99/288, 290, 295, 323.2, 634
See application file for complete search history.

(56) References Cited

U.S. PATENT DOCUMENTS

| 7,753,236 | B2 | 7/2010 | Williams |
| 9,783,403 | B2 | 10/2017 | Tansey, Jr. |
| 10,604,394 | B1 | 3/2020 | Cazeneuve et al. |
| 2010/0128556 | A1 | 5/2010 | Shultis |
| 2011/0226343 | A1* | 9/2011 | Novak ................. B67D 1/0406 |
| | | | 99/323.2 |
| 2013/0233180 | A1 | 9/2013 | Belmont |

FOREIGN PATENT DOCUMENTS

| EP | 3003960 B1 | 2/2020 |
| GB | 2506940 B | 9/2015 |

OTHER PUBLICATIONS

Philips Saeco AquaClean Calc and Water Filter, retrieved online from https://www.usa.philips.com/c-p/CA6903_47/aquaclean-calc-and-water-filter on Nov. 29, 2021, 7 pages.

* cited by examiner

*Primary Examiner* — Phuong T Nguyen
(74) *Attorney, Agent, or Firm* — Daylight Law, P.C.

(57) ABSTRACT

Solvent cartridges for fluid mixture dispensing devices are disclosed. One disclosed solvent cartridge comprises a solvent chamber exposed to atmospheric pressure, a straw located in the solvent chamber and in air-tight fluid communication with a filter assembly along a line of air-tight fluid communication, a sealed device interface in air-tight fluid communication with the filter assembly along the line of air-tight fluid communication, and a filter located in the filter assembly. The filter is positioned across the line of air-tight fluid communication to filter solvent from the solvent chamber.

17 Claims, 9 Drawing Sheets

FLUID MIXTURE DISPENSING DEVICE

BACKGROUND

Many fluid mixture dispensing devices are designed to operate with solvents provided from a source that could have been potentially exposed to some kind of contamination. For example, many devices, such as coffee makers, include a water tank that can be refilled by a user. The water provided may be tap water or water from another source which may not have been filtered or purified. The water may contain not only harmful bacteria, viruses, or parasites that can be inadvertently ingested by a user of the device, but also natural sediments which can be harmful for the user and/or the mechanical performance of the devices themselves.

Filtering systems are used in some fluid mixture dispensing devices of the prior art to address those concerns. In some cases, a filtering system can be purchased separately and installed in an outlet of the water tank. Water can then flow through the filter, for example in a gravity fed path, before it passes on to the device. In other cases, the device itself is provided with a filter to filter the water received from an external source such as the water tank. In such cases, the use of a filtering system external to the water tank is used and the water tank itself is not provided with an integrated filtering assembly to filter the water to be used by the device.

SUMMARY

This disclosure relates generally to fluid mixture dispensing systems and methods, and more specifically, to filtered solvent cartridges for fluid mixture dispensing systems.

The fluid mixture dispensing device of specific embodiments of the invention may be configured to dispense a fluid mixture created from at least one ingredient stored in an ingredient reservoir of the device and/or at least one solvent stored in a solvent reservoir of the device. The fluid mixture dispensing device can include one or more solvent cartridges to store one or more solvents. The solvent cartridge can be a removable solvent cartridge, such as a removable solvent tank or pitcher, that can be refilled by a user of the device.

The solvent cartridge can include a chamber and a cover of the chamber. The solvent cartridge can further include a filtering assembly that comprises a filter to filter the solvent stored in the chamber as it flows to other parts of the fluid mixture dispensing device. The filtering assembly can be connected to a straw located in the interior of the chamber, and to a device interface attached to the cover of the chamber. A line of fluid communication can then be formed from the solvent cartridge to the fluid mixture dispensing device via the straw, the filtering assembly, and the device interface. Solvent can then flow from the solvent cartridge to other parts of the device through the line of fluid communication. Various seals can be provided throughout the line of fluid communication so that the line is a line of air-tight fluid communication. A pressure differential can be created in such line of air-tight communication so that solvent can be pulled from the cartridge to other parts of the device through the line of air-tight communication.

The filter of the filtering assembly can be positioned across the line of air-tight fluid communication so that, as solvent is pulled from the solvent cartridge and routed to other parts of the device, the solvent is filtered by the filtering structure placed in the line of fluid communication. This configuration can provide the advantage of filtering a solvent on the fly with minimum resource expenditure and minimum design complexity, leveraging the structural components of the line of fluid communication from the solvent cartridge to the device. In specific embodiments of the invention, providing a filtering assembly integrated with the solvent cartridge can be advantageous in that it can contribute to an efficient use of the space inside the device to which the cartridge is paired, because the fluid mixture dispensing device does not necessarily need to include an internal solvent filter, which can consume space and involve architectural complexity in the interior distribution of components of the device. Furthermore, such internal filter could be more difficult to access and replace. Providing a cartridge with an integrated solvent filter in accordance with specific embodiments of the invention can also be advantageous in that the filtering assembly is already provided with the cartridge, in the line of fluid communication. In this way, it can be assured that the line of fluid communication is sealed, and no unfiltered solvent can potentially reach other parts of the device without having passed through the filter. Furthermore, there is no need for an external system to be installed, which could consume unnecessary space in the solvent cartridge and add complexity to the installation and use of such cartridge.

In specific embodiments of the invention, a solvent cartridge for a fluid mixture dispensing device is provided. The solvent cartridge comprises a solvent chamber, wherein the solvent chamber is exposed to atmospheric pressure, a straw located in the solvent chamber and in air-tight fluid communication with a filter assembly along a line of air-tight fluid communication, a sealed device interface in air-tight fluid communication with the filter assembly along the line of air-tight fluid communication, and a filter located in the filter assembly. The filter is positioned across the line of air-tight fluid communication to filter solvent from the solvent chamber.

In specific embodiments of the invention, a fluid mixture dispensing device is disclosed. The fluid mixture dispensing device comprises a solvent cartridge installed in a solvent cartridge slot of the fluid mixture dispensing device, a solvent chamber of the solvent cartridge, wherein the solvent chamber is exposed to atmospheric pressure, a filter assembly located in the solvent cartridge, a straw located in the solvent chamber and in air-tight fluid communication with the filter assembly along a line of air-tight fluid communication, a solvent cartridge interface, a sealed device interface on the solvent cartridge in air-tight fluid communication with both the filter assembly and the solvent cartridge interface along the line of air-tight fluid communication, a pump located in the fluid mixture dispensing device and configured to pump solvent from the solvent chamber through the line of air-tight fluid communication into the fluid mixture dispensing device, and a filter. The filter is located in the filter assembly and positioned across the line of air-tight fluid communication.

In specific embodiments of the invention, a fluid mixture dispensing device is provided. The fluid mixture dispensing device comprises a removable solvent cartridge configured to slide into the fluid mixture dispensing device to form an air-tight connection with a cartridge interface on the fluid mixture dispensing device, a solvent chamber of the removable solvent cartridge storing a solvent at atmospheric pressure, a straw located in the solvent chamber and in air-tight fluid communication with the cartridge interface via the air-tight connection, a pump located in the fluid mixture dispensing device and configured to pump solvent from the solvent chamber through the straw and the cartridge interface into the fluid mixture dispensing device, and a filter.

The filter is located in the removable solvent cartridge between the straw and the air-tight connection.

BRIEF DESCRIPTION OF THE DRAWINGS

In the Figures, like reference numbers correspond to like components unless otherwise stated.

DETAILED DESCRIPTION

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Different components and methods for a fluid mixture dispensing device will be described in detail in this disclosure. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

Figure 1A:
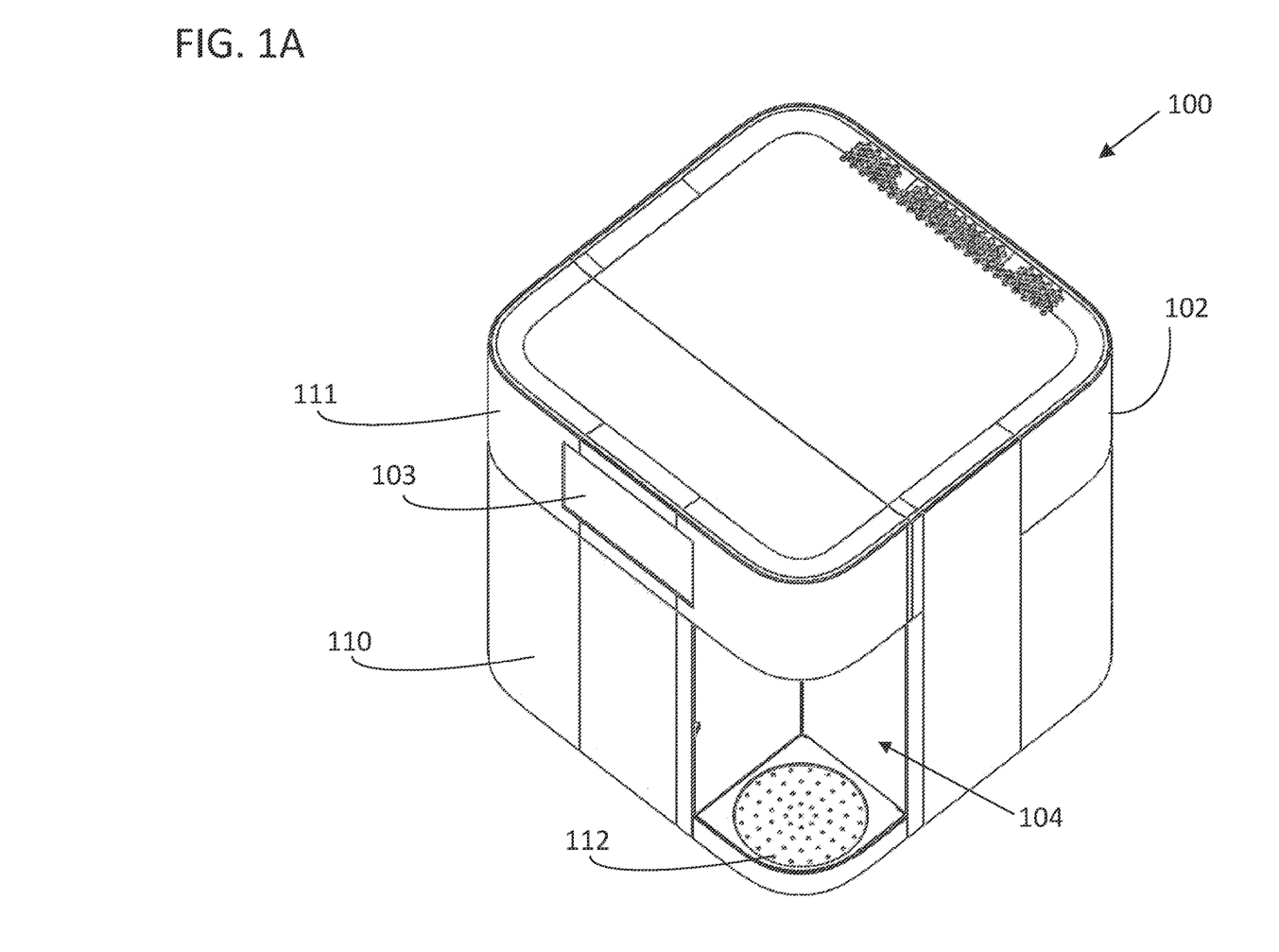
FIG. 1A illustrates an example of a fluid mixture dispensing device, in accordance with specific embodiments disclosed herein.

FIG. 1A illustrates an example of a fluid mixture dispensing device 100, in accordance with specific embodiments disclosed herein. The fluid mixture dispensing device 100 can be any of the fluid mixture dispensing devices described in U.S. Provisional Patent Application No. 63/146,461 filed Feb. 5, 2021 and U.S. patent application Ser. No. 17/547,081 filed Dec. 9, 2021, both of which are incorporated by reference herein in their entirety for all purposes.

The fluid mixture dispensing device 100 can include a casing, such as casing 102, that can house various internal components of the device. The casing 102 can include various accesses to the interior of the device. The accesses can be in the form of doors, such as upper access door 111 and lower access door 110. The accesses can also be removable portions, such as lids or walls of the casing. The accesses can be configured so that a user of the device can access at least part of the interior of the device, for example to replace a component, to clean the device, etc., as will be described below in more detail.

The fluid mixture dispensing device can also include a user interface, such as user interface 103. The user interface 103 can include any means for outputting information from the device to a user of the device, and for inputting information from the user of the device to the device. In this way, the user interface can include any means that facilitate the interaction of a user of the device with the device, including but not limited to a display, a speaker, a microphone, a camera, various sensors such as light and presence sensors, etc. For example, the user interface can include a touch screen display, so that the device can display information for the user via the display, and the user can provide inputs to the device via the touch screen display. As another example, the interaction between the user and the device can be via auditory cues provided by the device via a speaker and voice commands from the user received via a microphone. As another example, the device can recognize user facial expressions and gestures via cameras and sensors. The user interface components can be associated to a controller of the device so that the controller can administrate the information to be outputted and process the information being received.

The fluid mixture dispensing device 100 can also include a dispense area, such as dispense area 104. Dispense area 104 can be the area where a fluid mixture is dispensed out of the device 100. Dispense area 104 can be an area configured to receive a vessel or other containers to dispense a beverage out of device 100. The dispense area 104 can be sized so that different containers (for example a wine glass) can be placed therein. In specific embodiments of the invention, the dispense area 104 can be adjusted, for example by using a height adjustable tray. The dispense area 104 can include a waste outlet, such as waste outlet 112. The waste outlet can be a removable waste outlet, such as a removable drip tray.

Figure 1B:
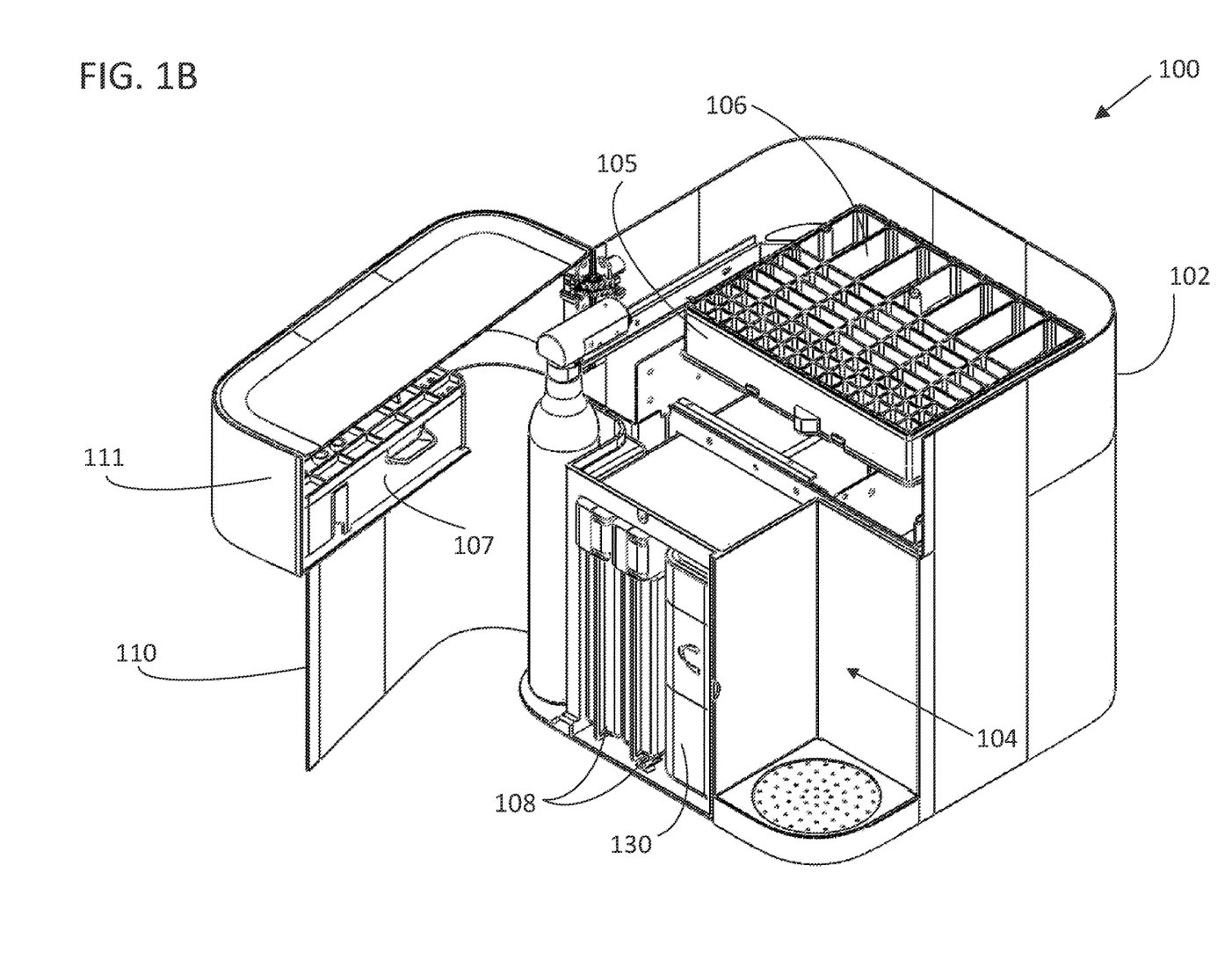
FIG. 1B illustrates exemplary internal components of a fluid mixture dispensing device, in accordance with specific embodiments disclosed herein.

FIG. 1B illustrates the fluid mixture dispensing device 100 of FIG. 1A in an open configuration to illustrate exemplary internal components that can be housed by the casing 102 of the fluid mixture dispensing device 100, in accordance with specific embodiments disclosed herein. The accesses, such as upper access door 111 and the lower access door 110, are open in this figure. The doors can be attached to the remaining of the casing via hinges or other structure. The doors can alternatively be removable doors so that they are completely removed when open. The doors can be any kind of doors such as sliding doors, and open in any direction, for example to the top or to the right of the device. Doors 111 and 110 can be separate doors or a unitary door of the device. In this example, the access doors have been represented in the front wall of the device. However, this is not a limitation of the invention. Different doors and/or any access to the interior of the device can be located anywhere on the device, and do not need to be located on the front wall. In the example of FIG. 1B, a portion of the top wall of the device 100 has been removed to expose some additional exemplary components of the device.

The fluid mixture dispensing device 100 can include one or more ingredient reservoirs, such as ingredient reservoirs 106. The ingredient reservoirs can store ingredients to be used by the fluid mixture dispensing device 100 to create a beverage, such as concentrated liquids (e.g., flavor syrups, salts, acids, etc.). The ingredient reservoirs can be any of the ingredient reservoirs described in U.S. Provisional Patent Application No. 63/146,461 filed Feb. 5, 2021, U.S. patent application Ser. No. 17/547,081 filed Dec. 9, 2021, and U.S. patent application Ser. No. 17/545,699 filed Dec. 8, 2021, all of which are incorporated by reference herein in their entirety for all purposes.

The ingredient reservoirs, such as ingredient reservoirs 106, can be located in a cartridge, such as cartridge 105. The cartridge can be accessed via one of the accesses of the device. For example, the cartridge can be accessed through upper access door 111. In this way, a user of the device can replace the cartridge as needed. In the example of FIG. 1B, the top surface of cartridge 105 has been removed to expose the ingredient reservoirs 106. However, the cartridge can be completely encased. In specific embodiments of the invention, the cartridge includes a removable lid so that the various ingredient reservoirs can be accessed, for example to be refilled. The cartridge can be any of the cartridges described in U.S. Provisional Patent Application No. 63/146,461 filed Feb. 5, 2021, U.S. patent application Ser. No. 17/547,081 filed Dec. 9, 2021, U.S. patent application Ser. No. 17/547,612 filed Dec. 10, 2021, and U.S. patent application Ser. No. 17/545,699 filed Dec. 8, 2021, all of which are incorporated by reference herein in their entirety for all purposes.

The fluid mixture dispensing device 100 can also include one or more solvent reservoirs, such as solvent reservoir 108. The solvent reservoirs can store solvents to be used by the fluid mixture dispensing device 100 to create a beverage, such as water, alcohol, etc. The solvent reservoirs can be any of the solvent reservoirs described in U.S. Provisional Patent Application No. 63/146,461 filed Feb. 5, 2021 and U.S. patent application Ser. No. 17/547,081 filed Dec. 9, 2021, both of which are incorporated by reference herein in their entirety for all purposes. The solvent reservoirs can be accessed via one of the accesses of the device. For example, the solvent reservoirs can be accessed through lower access door 110. In this way, a user of the device can remove the solvent reservoirs as needed, for example to refill a water tank.

The fluid mixture dispensing device 100 can be configured to create a beverage by mixing one or more ingredients from one or more ingredient reservoirs 106 and/or one or more solvents from one or more solvent reservoirs 108 and/or solvent cartridge 130. A controller of the system can have knowledge of the amount of each ingredient and/or solvent needed for a given recipe and cause the device to dispense the required amount of ingredient and/or solvent to a mixing area of the device or to any other area of the device such as to a final dispense chamber 107, chilling tank, dissolution chambers, etc., and/or out of the device to the dispense area 104.

Figure 2:
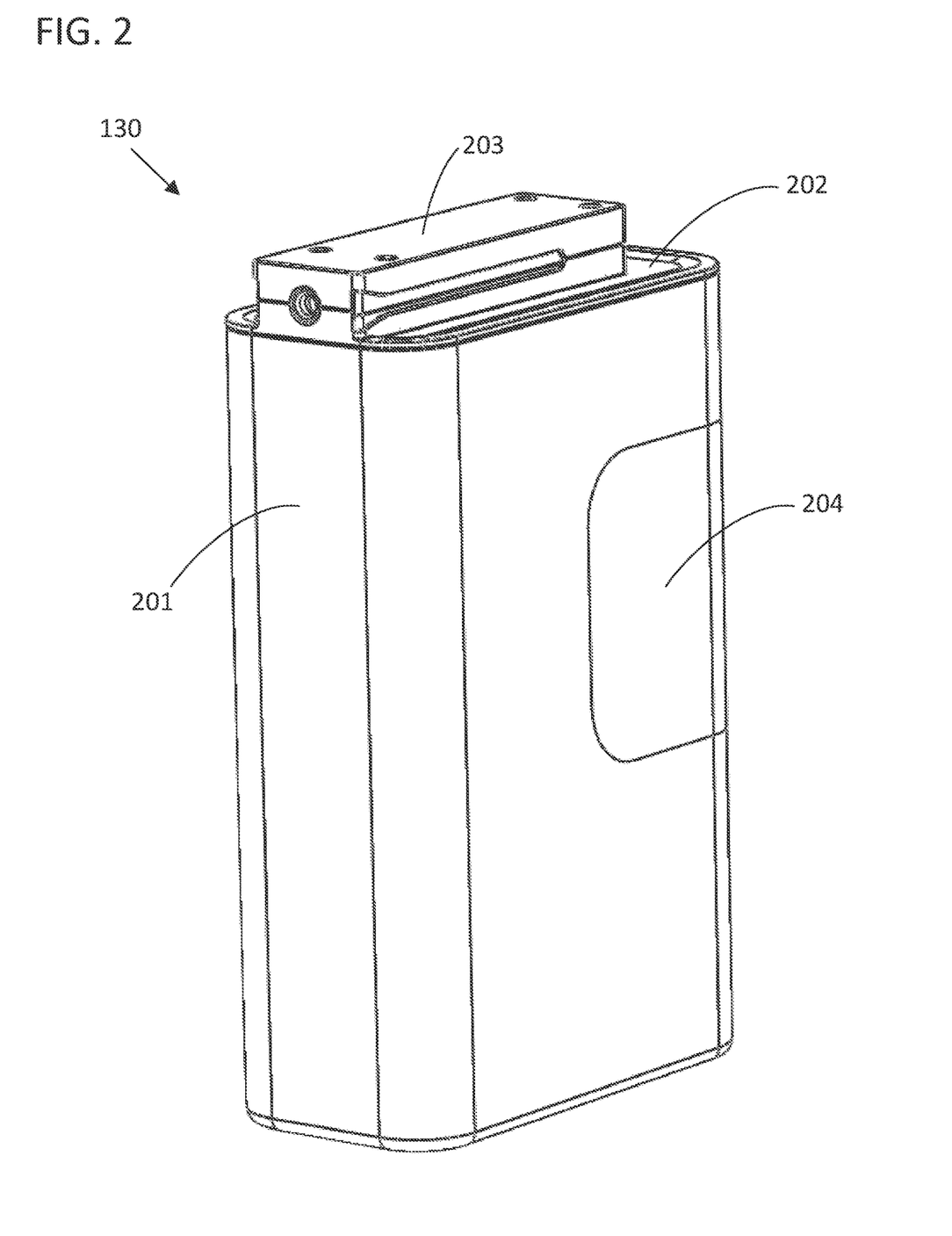
FIG. 2 illustrates an example of a solvent cartridge, in accordance with specific embodiments disclosed herein.

In specific embodiments of the invention, the solvent reservoirs can be in the form of solvent cartridges, such as solvent cartridge 130. The solvent cartridge 130 can be a removable solvent cartridge, such as a cartridge that a user can remove for example via access door 110. The solvent cartridge 130 can be refillable solvent cartridge, such as a water tank that a user of the device can fill with water or other solvent as needed. FIG. 2 illustrates an example of a solvent cartridge, such as solvent cartridge 130, in accordance with specific embodiment of the invention.

The solvent cartridge 130 can include a solvent chamber 201 to store a solvent (e.g., water). The solvent chamber can be made of any suitable material such as plastic, BPA free resins (e.g., styrene acrylonitrile (SAN), styrene methyl methacrylate (SSMA)), glass, stainless steel, ceramic, etc. In specific embodiments of the invention, the material is transparent, such as a transparent plastic, so that the content in the interior of the chamber is visible. This can allow users to verify the amount of solvent left in the chamber by a simple visual inspection.

The solvent chamber can take on various forms. The example illustrated in FIG. 2 includes a chamber in the form of a cuboid, but this is not a limitation of the invention. The chamber can be a cube, a sphere, or take on any other 3D shape that is suitable to store a liquid solvent and to be placed in a slot in the device 100 as illustrated in FIG. 1B. In specific embodiments of the invention, the solvent chamber 201 is shaped to fit a receiving space in the device 100, as illustrated in FIG. 2. In specific embodiments of the invention, the chamber 201 can include a handle or other structure to facilitate handling of the chamber. In the example illustrated in FIG. 2, the chamber 201 is shaped so that portion 204 of the chamber serves as a handle for the chamber. Portion 204 can be molded in the chamber, for example an indentation in the material of the chamber itself.

The specific dimensions and therefore capacity of the solvent chamber are not a limitation of the present invention. Constraints such as the size of the device where the solvent cartridge will be used can be considered when designing the chamber 201. For example, a countertop device for domestic use may use a smaller cartridge than a standalone device for commercial use. A small chamber will store less solvent than a bigger one and therefore may need to be refilled more often but may be advantageous if the overall device dimensions are limited. In specific embodiments of the invention, the chamber 201 can hold up to 2100 ml, for a chamber with dimensions of 15.2 cm×7.62 cm×22.8 cm.

The solvent cartridge 130 can also include a cover 202 for the chamber 201. The cover 202 can be an upper wall of the chamber or a removable cover, such as a lid. The cover 202 can simply rest on the chamber to cover it or be detachably attached to the chamber. For example, the cover can be shaped to snugly fit into the top of the chamber, or can be attached with a snap connection, or the chamber 201 and the cover 202 can include matching attachment means such as slots and bumps that fit together, screws and screw heads, or any other means that allow the cover 202 to be attached to the chamber 201.

The cover 202 can be made of any suitable material such as plastic (e.g., polypropylene, high density polyethylene (HDPE), Acetal, Nylon, Styrene acrylonitrile resin (SAN), or styrene methyl methacrylate (SMMA)), glass, ceramic, stainless steel, etc. In specific embodiments of the invention, the cover 202 and the chamber 201 are made of the same material. In specific embodiments of the invention, different parts of the cover can be of different material. For example, the cover can include a hard plastic portion and a rubber-like portion surrounding the hard plastic to provide a snug connection with the chamber. The cover 202 can include an interface 203, which can be an interface to provide a fluid communication with a device, such as device 100. The interface 203 can be a sealed device interface so that solvent can flow from the cartridge to the device through a line of air-tight fluid communication, as will be described below in this disclosure. The various parts of the cover, including the interface 203, will be described in more detail below in this disclosure.

In specific embodiments of the invention, the solvent cartridge 130 can include a placement interface. The placement interface of the solvent cartridge can be configured to match a placement interface of the device 100, so that the cartridge has a guide to be placed in the device in the appropriate position that allows the fluid interfaces (including device interface 203) to be properly connected to the device. In specific embodiments of the invention, the cartridge 130 is configured to slide into a slot in device 100. In those embodiments, the placement interface can be a groove or similar structure for the cartridge to slide into the slot in the device. In specific embodiments of the invention, providing a placement interface can be advantageous to provide a proper connection so that solvent can be successfully extracted from the cartridge 130. The placement interface can be on the cover 202 of the solvent cartridge, the bottom, or to any of the side walls.

Figure 3:
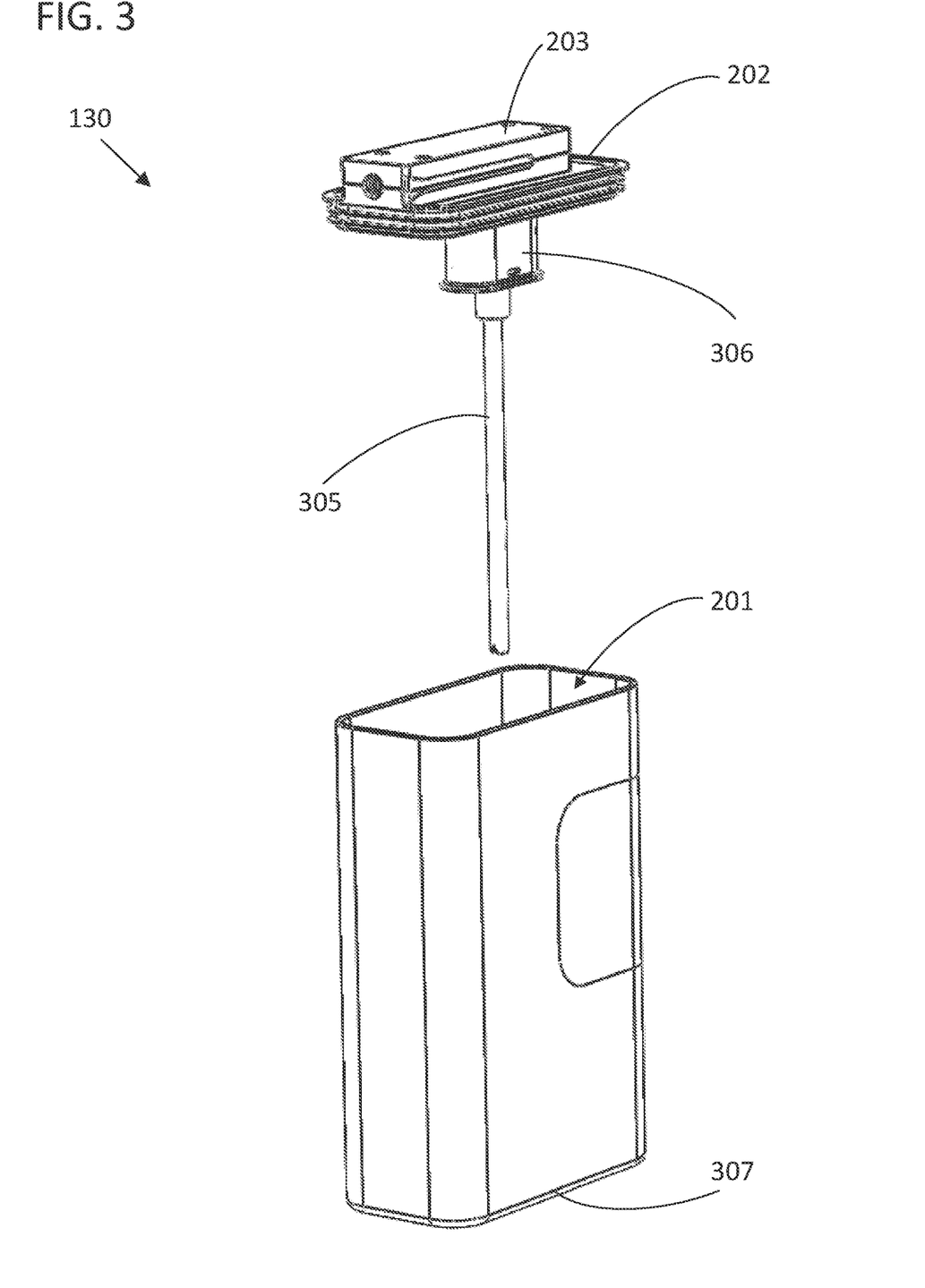
FIG. 3 illustrates an exploded view of the solvent cartridge of FIG. 2, in accordance with specific embodiments disclosed herein.

FIG. 3 illustrates an exploded view of the solvent cartridge 130 of FIG. 2. As illustrated, the solvent cartridge 130 can include a straw 305. The straw can provide a line of fluid communication from the solvent chamber to the solvent chamber cover 202, and out to the device 100 via the interface 203. In this way, solvent stored in the chamber 201 can flow to the device as needed through the straw 305. The straw 305 can be of any suitable material such as stainless steel, ceramic, plastic (e.g., polypropylene, high density polyethylene (HDPE), acetal, nylon, styrene acrylonitrile resin (SAN), or styrene methyl methacrylate (SMMA)), metal, etc. In specific embodiments of the invention, the straw 305 can be of the same material than any of the cover 202 and/or the chamber 201. The dimensions of the straw can vary according to the dimensions of the cartridge 130. In specific embodiments of the invention, one end of the straw 305 can be attached to the cover 202 and be shaped so that, when the cover 202 is attached to the chamber 201, the other end of the straw 305 reaches the bottom surface 307 of the chamber. The diameter of the straw can be designed so that it is wide enough to provide a desired flow rate (e.g., 15 ml per second or more). At the same time, the diameter of the straw can be designed so that it is narrow enough to allow a desired pressure differential to be created to pull the solvent out of the cartridge, as will be explained in more detail below. These and other considerations can be taken into account when designing the various parts of the cartridge 130.

Figure 4:
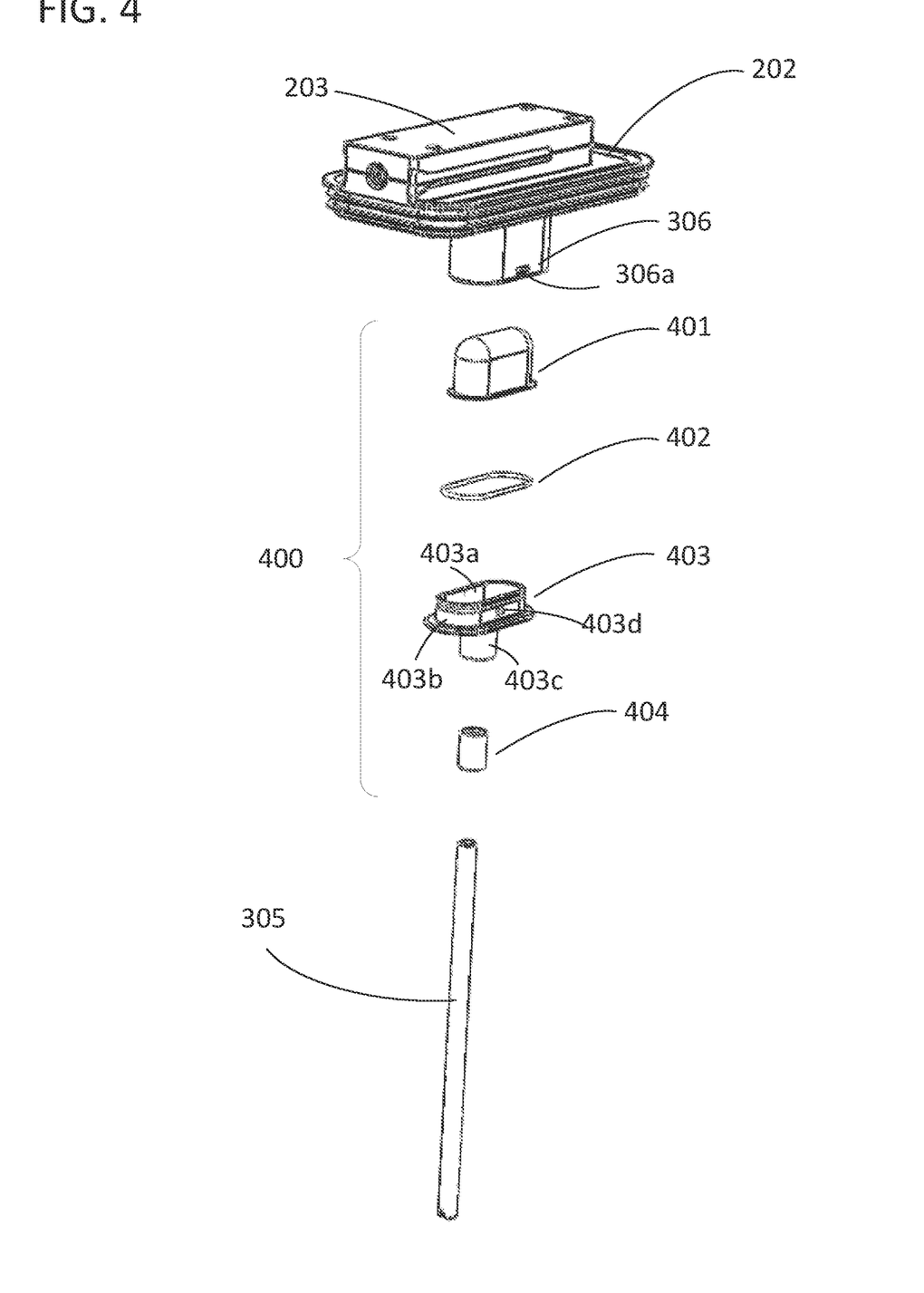
FIG. 4 illustrates an exploded view of some components of the solvent cartridge of FIG. 2, in accordance with specific embodiments disclosed herein.

In specific embodiments of the invention the cartridge 130 includes an interface 306 between the straw 305 and the cover 202. The interface 306 can include an assembly to which the straw 305 can be attached. In specific embodiments of the invention, the assembly can be a filter assembly. The filter assembly can be part of or be otherwise attached to the cover 202. The filter assembly can be housed by the interface 306 in the cartridge 130. FIG. 4 includes an exploded view of the cartridge 130 where further details can be appreciated, including an exemplary filter assembly 400 that can be housed in the interface 306 introduced with reference to FIG. 3.

The filter assembly 400 can include a filter 401. In specific embodiments of the invention, the filter 401 can be located in the filter assembly and positioned across a line of fluid communication between the solvent chamber 201 and the device 100. In this way, solvent can be filtered while it flows from the solvent cartridge 130 to other parts of the device 100. The filter can be to filter the solvent stored in the chamber 201 so that contaminants, sediment, and/or other small particles that could potentially be in the solvent stored in the chamber can be filtered out.

In specific embodiments of the invention the solvent to be stored in the chamber 201 is water, and the filter 401 is a water filter or water purifier, configured to filter/purify the water before it is used by the device 100 to prepare a fluid mixture, for example a beverage to be ingested by a user. In specific embodiment of the invention, the solvent to be stored in the chamber 201 can be provided from a source which may have been exposed to contamination (e.g., tap water, etc.). In those embodiments, the use of a filter in the line of fluid communication can be advantageous in that those contaminants can be prevented from entering the device and not only contaminate a fluid mixture but also cause mechanical damage to the device, such as calcification or buildups due to sediments in the solvent.

In specific embodiments of the invention, the filter can be a charcoal filter or other carbon filter. Other filtration technologies could be used such as ion-exchange resins, sediment filter, Reverse Osmosis (RO) membranes, composite filters, etc. In specific embodiments of the invention the filter can be capable of removing 90%-99% of contaminants such as total dissolved solids (TDSs) in the solvent. In specific embodiments of the invention, the filter can effectively remove 99.99% of the contaminants, with a 0.0001 filtration accuracy. The filter can be an off-the-shelf filter that can be installed in the interface 306.

In specific embodiments of the invention, the filter can include more dedicated components. For example, the filter can be a tablet comprising one or more substances to be released into the solvent when the solvent passes through the filter. In specific embodiments of the invention, the filter can be a cleaning product tablet so that a cleaning solution can be formed when the solvent passes through the filter. This can be used to, for example, clean one or more channels of device 100 that are in fluid communication with the filter. In specific embodiments of the invention the filter 401 is a removable filter so that it can be, for example, replaced when worn out. In those embodiments, the filter can be removed, and a tablet or other product can be placed in the interface 306 instead. In this way, a solvent filter can be used in the normal operation of the device to filtrate a solvent in the chamber 201 before it flows to other parts of device 100, but a dedicated product can be used at other times (e.g., a cleaning tablet can be placed in a filter slot for a cleaning cycle of the device).

In specific embodiments of the invention, the filter assembly can include a filter holder or filter lid 403. The filter lid 403 can be configured to receive the filter 401. For example, the filter lid 403 can include an opening 403a where the filter 401 can be inserted. The filter can be attached to the filter lid via a snap connection (e.g., the filter 401 can be shaped to pop-in to the opening 403a of the filter lid 403). As another example, the opening 403a can be slightly narrower than the base of the filter, so that the filter can be squeezed and inserted on the lid 403. Alternatively, the filter lid 403 can include attachment means for the filter such as ribs, hooks, or other means.

The filter lid 403 can include a first interface 403b for a connection with the cover 202 of the chamber 201, and more specifically with an interface such as interface 306 in the cover 202. The connection can be a snap connection or other connection. The filter lid 403 and/or the cover can include attachment means to be attached to each other. For example, the filter lid 403 and the cover 202 can include matching attachment means so that they "click" and are held together, such as matching concave and convex ribs. In specific embodiment of the invention, one of the filter lid 403 and the cover 202 include holes or slots (e.g., 306a) and the other of the filter lid 403 and the cover 202 include protuberances (e.g., positive displacement bumps 403d) that fit into those holes or slots. In other embodiments, the filter lid 403 can be of a material flexible enough so that it can be slightly compressed to snugly fit into the interface 306. In specific embodiment of the invention, the filter lid 403 and the cover 202 can include a keying connection where matching locking interfaces can be provided to attach the parts together and can be alternatively further twisted for "locking" the connection. These and other attachment means can be provided in the connections of any of the parts of the device and this should not be construed as a limitation of the invention.

The filter lid 403 can include a second interface 403c for a connection with the straw 305. The straw 305 can be attached to the filter assembly 400 via the filter lid 403, and more specifically by attaching to the interface 403c of the filter lid 403. The straw can be connected to the filter lid by being inserted into the interface 403c. Both the straw 305 and the interface 403c can be shaped so that a snug fit is provided between the two, or in any of the ways described for the connection for the filter lid with the chamber cover 202.

In specific embodiments of the invention, the filter assembly 400 can include one or more seals. The seals can be to seal the various connections throughout the line of fluid communication so that the line of fluid communication is a line of air-tight fluid communication. A seal, such as o-ring seal 402, can be used in the interface between the filter assembly 400 and the cover 202 of the cartridge, and more specifically, between the filter lid 403 and an interface such as interface 306 in the cover 202. The seal can be used to provide a sealed interface between the filter assembly 400 and the cover 202 of the cartridge, so that the connection is an air-tight connection. The seal can be a gasket or any other kind of seal, of any suitable material such as rubber or silicone. The seal can be attached to the filter lid 403 (for example surrounding the interface 403b), so that when the filter lid 403 is attached to the cover 202, the seal sits between the two parts sealing the connection. A seal, such as gasket 404, can be used in the interface between the filter assembly 400 and the straw 305, and more specifically, between the filter lid 403 and the straw 305. The seal can be used to provide a sealed interface between the filter assembly 400 and the straw 305, so that the connection is an air-tight connection. The seal can be a gasket or any other kind of seal, of any suitable material such as rubber or silicone. The seal can be placed between the filter lid 403 and the straw, so that when the filter lid 403 is attached to the cover straw, the seal sits between the two parts sealing the connection.

A line of fluid communication can be formed from the bottom of the chamber 201 to the cover 202. The line of fluid communication can be a line for solvent stored in the chamber 201 to flow out of the chamber and, for example, to other parts of the device 100. The line of fluid communication includes the straw 305, so that solvent can be pulled out of the chamber, and the filter assembly 400, so that the solvent can be filtered as it is pulled out of the chamber. As described before in this disclosure, this implementation can be advantageous in that the solvent can be filtered "on the fly" as it is pulled out of the chamber.

In specific embodiments of the invention, the line of fluid communication can be a line of air-tight fluid communication. As described with reference to FIG. 4, various seals such as seals 402 and 404 can be provided so that the connections throughout the line are sealed connections. In specific embodiments of the invention, providing a line of air-tight fluid communication can be advantageous in that it can allow the solvent to be pulled out of the chamber via a pressure differential created in the line of air-tight fluid communication. The pressure differential can be created, for example, by a pump. The pump can be located outside of the cartridge, for example in the device 100. As mentioned with reference to FIG. 2, cartridge 130 can include a device interface 203 to interface with the device 100. The device can be configured to pull the solvent out of the solvent cartridge via such interface.

As represented and explained with reference to FIG. 4, the straw 305 located in the solvent chamber 201 can be in air-tight fluid communication with the filter assembly 400 along a line of air-tight fluid communication. As will be further explained, the sealed device interface 203 can also be in air-tight fluid communication with the filter assembly along the line of air-tight fluid communication. The filter 401 located in the filter assembly is positioned across the line of air-tight fluid communication and therefore can filter solvent as it flows from the solvent chamber 201 to other parts of the device 100, via the straw 305, the filter assembly 400, and the device interface 203.

Figure 5:
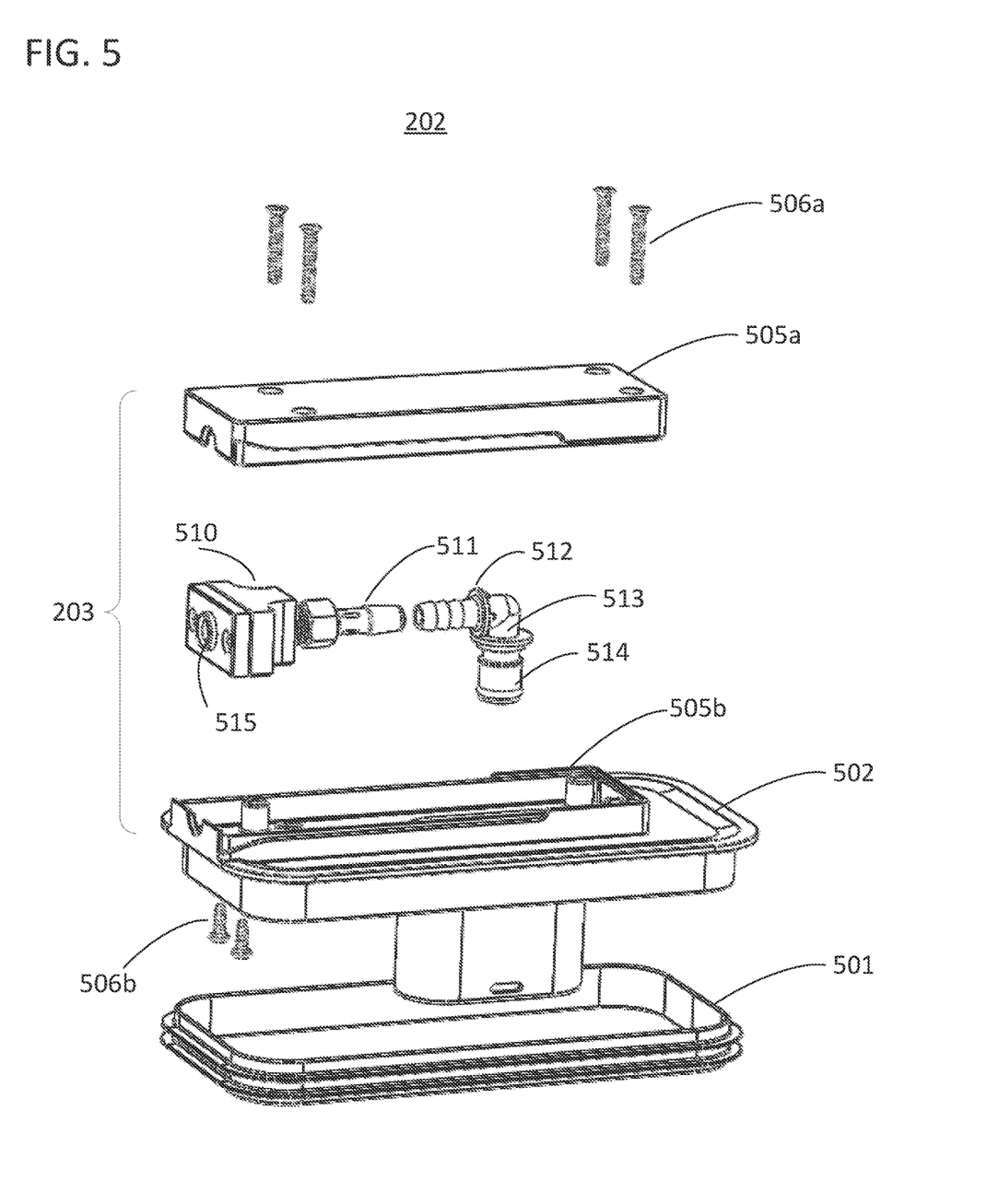
FIG. 5 illustrates an exploded view of a cover of the solvent cartridge of FIG. 2, in accordance with specific embodiments disclosed herein.

FIG. 5 illustrates an exploded view of a cover of the cartridge 130, such as cover 202, including an exploded view of the device interface 203. The cover 202 can include a seal 501. The seal can be used in the connection between the cover 202 and the chamber 201, for example to provide tolerance to the connection and avoid a loose fitting. The seal can be of any suitable material such as rubber or silicone. In specific embodiments of the invention, the seal 501 can be used to provide a snug connection between the cover 202 and the chamber 201. A snug fit can be advantageous, for example, to prevent the cover 202 from falling off and solvent from inside the chamber 201 spilling out of the chamber when the chamber is moved around. In specific embodiments of the invention, the seal 501 can be used to provide a sealed connection between the cover 202 and the chamber 201. A sealed connection can be advantageous, for example, to protect the solvent from exposure to the exterior of the chamber, to provide a vacuum in the chamber, etc.

FIG. 5 also illustrates the core 502 of the cover 202, to which the seal 501 can be attached. The core can be made of any of the materials described previously as a general description for the cover 202. The core can be attached to the chamber in any of the ways described previously as a general description for the cover 202. The device interface 203 can include a casing 505a and 505b. A portion of the casing 505b can be permanently or detachably attached to the core 502. The casing can be molded into the cover or be attached via an attachment means such as screws 506b, adhesives, or other means. The upper portion of the casing 505a can also be permanently or detachably attached to the bottom portion of the casing 505b. The upper portion can be molded into the bottom portion or be attached via an attachment means such as screws 506a, adhesives, or other means.

The device interface 203 itself can include a connection block 510. The connection block can be the block that provides the actual interface with the device. The connection block 510 can include one or more valves or other structures that allow a cartridge interface of the device to connect to and pull solvent from the cartridge. The cartridge interface of the device 100 can connect to the cartridge via an orifice, such as opening 515. An example of such interaction will be described later with reference to FIG. 6. The device interface 203 can also include tubing, such as tubes 511 and 513, that extend the line of fluid communication from the cover of the chamber to the device 100. The device interface 203 can also include one or more seals, such as seals 512 and 514, so that the connections between the tubes, the cover, the block 510 and other parts of the interface 203, are sealed. In this way, the extended line of fluid communication can also be a line of air-tight fluid communication. The device interface 203 can then be a sealed device interface and extend the line of air-tight fluid communication into the device through an air-tight connection formed with a cartridge interface on the device 100.

Figure 6:
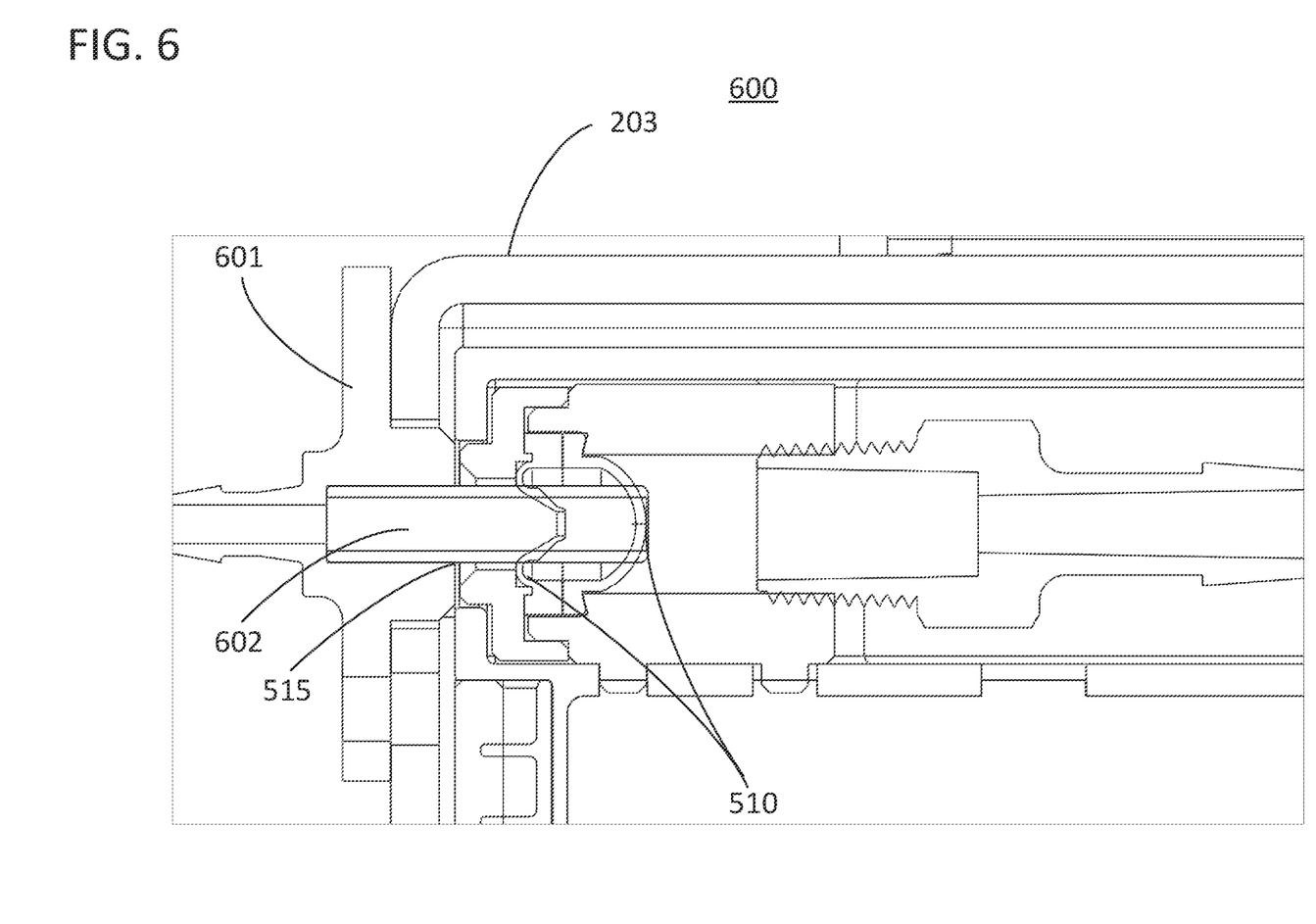
FIG. 6 illustrates an example of an interface between a fluid mixture dispensing device and a solvent cartridge, in accordance with specific embodiments disclosed herein.

FIG. 6 illustrates an example of a connection between a device interface in the solvent cartridge and a cartridge interface in the device 100. View 600 is a sectional view of the connection interfaces taken when the cartridge 130 is connected to the device 100. View 600 illustrates the device interface 203 of the cartridge connected to a cartridge interface 601 of the device 100. As illustrated, the cartridge interface 601 can include a protruding member, such as tube 602, that enters the device interface 203 via the orifice 515. The tube 602 can open or pierce the connection block 510 so that the line of fluid communication is extended to the device 100. As illustrated, the connection block 510 in this example includes two valves configured to be pierced. This configuration can avoid leaks while the device is connected/disconnected and seal the line of fluid communication.

As illustrated in FIG. 6, when the solvent cartridge 130 is connected to the device 100 a line of air-tight fluid communication is created from the bottom of the solvent chamber 201 to the device 100, via the straw 305, the filter assembly 400, and the device interface 203. A pump in device 100 can then be used to create a pressure differential in the line of air-tight communication. For example, a vacuum pump can create a negative pressure differential that causes the solvent stored in the chamber 201 to be pulled up as a result of the pressure differential created in the line.

In specific embodiments of the invention, the chamber 201 is exposed to atmospheric pressure. The fact that the chamber is exposed to atmospheric pressure can be advantageous in that the pressure differential needed to pull the solvent up could be created more easily than in an air-tight chamber. For example, if the chamber 201 was sealed, a vacuum would be created on top of the solvent volume as solvent is pulled out of the chamber. This vacuum could make the process of pulling solvent out more difficult, because a bigger effort may be needed from the pump to create the pressure differential to pull the solvent up.

Figure 7:
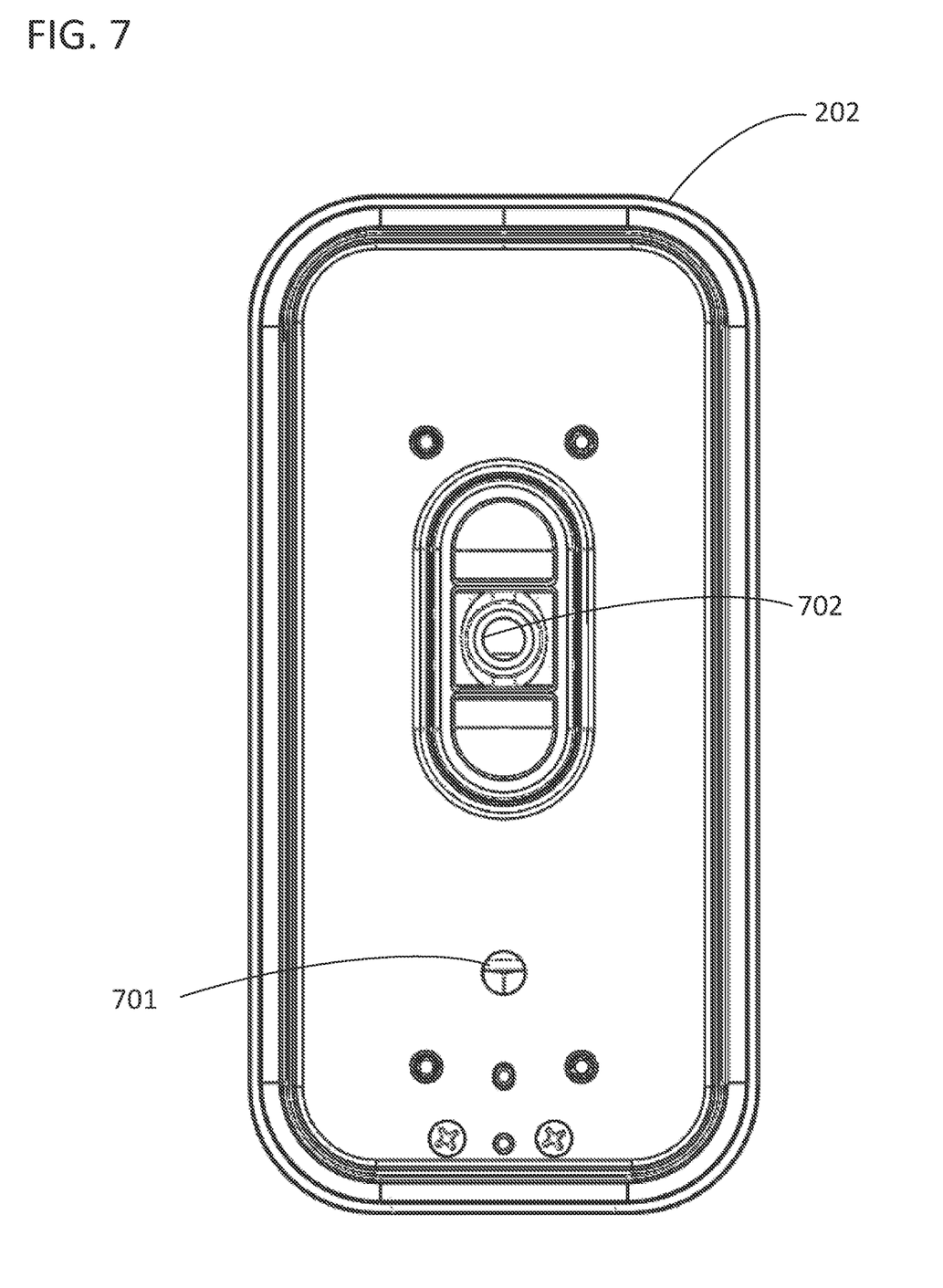
FIG. 7 illustrates a bottom view of the cover of the solvent cartridge, in accordance with specific embodiments disclosed herein.

The chamber 201 can be exposed to atmospheric pressure by simply being laid open, or by providing a non-air-tight connection between the chamber 201 and the cover 202. However, in some embodiments, a snug fit may be desired between the chamber 201 and the cover 202. Even if the seal is not air-tight, a snug fit may result in a pressure in the chamber which is less than atmospheric pressure when the solvent is being pulled out. To deal with these situations, specific embodiments of the invention include one or more pressure relief orifices. FIG. 7 illustrates a bottom view of the cover 202, where one pressure relief orifice 701 is illustrated. The pressure relief orifice 701 can include a fine filter and/or be connected to a circuitous path through cover 202 such that it connects the chamber to atmospheric pressure while not allowing solvent to easily leak from the chamber or for contaminants to enter the chamber. The orifice can be a hole in the core of the cover of any dimension that allows the chamber to be exposed to atmospheric pressure, as determined by a device manufacturer. FIG. 7 also illustrates a solvent path hole 702. This hole can be the hole through which the solvent passes after having passed the filter assembly 400. In specific embodiments of the invention, a structure, for example a tube such as tube 513 and/or a seal such as seal 514 can enter hole 702 so that the line of fluid communication passes through such hole. The structure can be detached from the hole so that, for example, the whole connection interface 203 can be detached from the cover 202.

Figure 8:
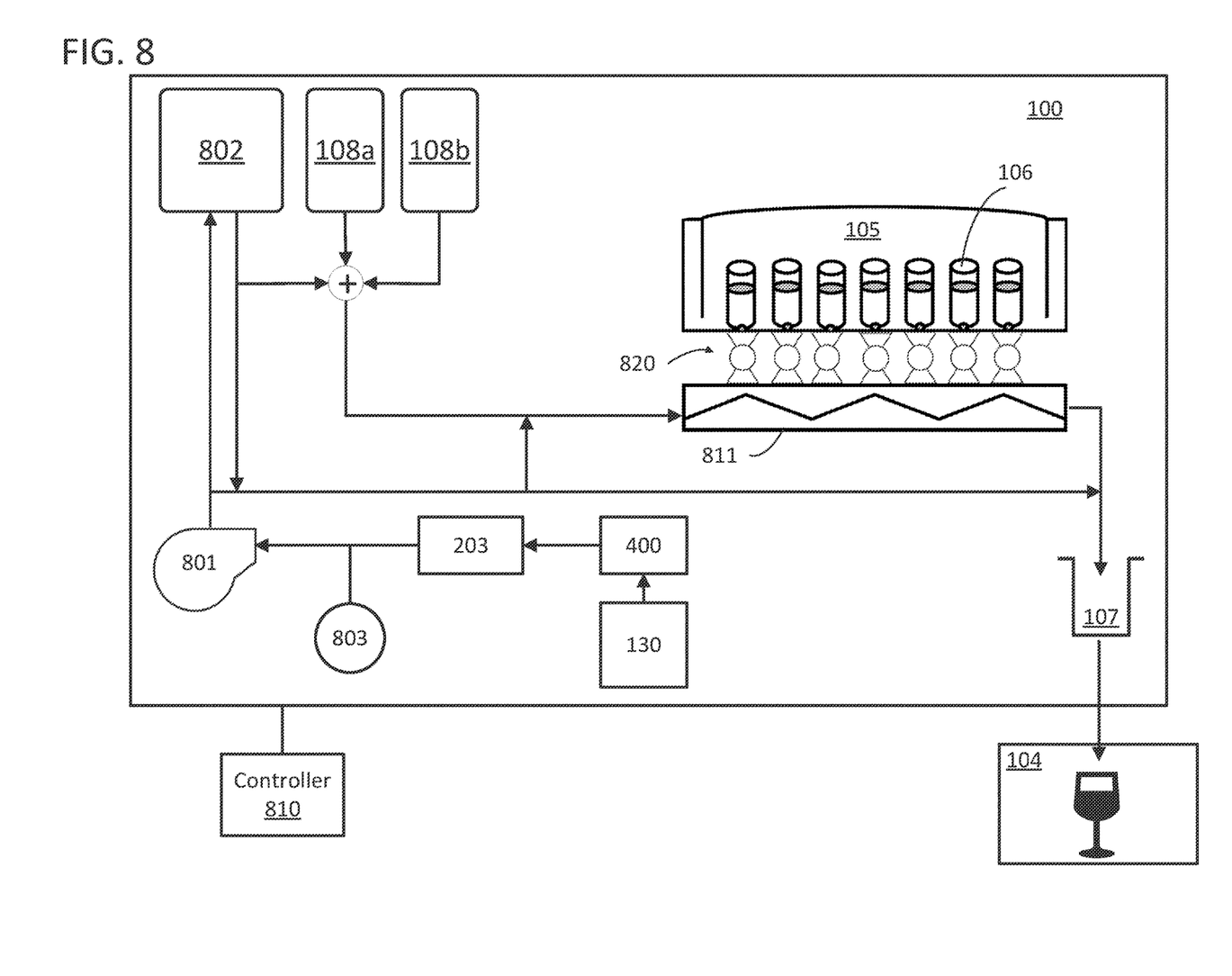
FIG. 8 illustrates a block diagram of a fluid mixture dispensing system including a solvent cartridge, in accordance with specific embodiments disclosed herein.

FIG. 8 illustrates a block diagram including some components of a fluid mixture dispensing device such as device 100, including the solvent cartridge 130 and some associated components described before in this disclosure. The block diagram illustrates examples of the multiple solvent paths from the solvent cartridge 130 to different parts of the device 100. As illustrated, the solvent exits the solvent cartridge 130 and passes through the filter assembly 400 and device interface 203. As described before, a pump such as pump 801 in the device can be used to move the solvent out of the cartridge 130. One or more sensors, such as sensor 803 can be used along the path to measure various parameters, for example a temperature of the solvent, a pressure in the solvent line, etc.

In specific embodiments of the invention, the solvent from the solvent cartridge 130 can be routed to one or more chiller tanks 802 of the device. The chiller tank can be a tank to store a solvent, such as water, and cool it. Solvent from the solvent cartridge 130 can be routed to the chiller tank 802 where solvent is continually chilled. If a fluid mixture requires chilled solvent (e.g., chilled water), the solvent can be provided from the chiller tank 802. As illustrated in the diagram, solvent from the chiller tank 802 can be provided directly to a final dispense chamber 107 of the device where it can be mixed with a fluid mixture therein and/or dispensed out of the device, or to a mixing area 811 where it can be mixed with one or more solvents (for example from solvent cartridge 108), and/or one or more ingredients (for example ingredients from ingredient reservoirs 106).

In specific embodiments of the invention, the solvent from the solvent cartridge 130 can be routed directly to the final dispense chamber 107 of the device, to be mixed with a fluid mixture therein and/or be dispensed out of the device. The solvent from the solvent cartridge 130 can also be routed to the mixing area 811 where it can be mixed with one or more solvents (for example from solvent reservoirs 108), and/or one or more ingredients (for example ingredients from ingredient reservoirs 106).

The fluid mixture device 100 can be configured to prepare and dispense a plurality of fluid mixtures. Each fluid mixture can have specific requirements, for example based on a recipe, based on user inputs or preferences, etc. A controller of the system, such as controller 810, can have knowledge of such requirements (for example the requirements can be stored in memory, received via user interface 103, accessed remotely from a library of recipes, etc.). The controller can then be programmed to actuate one or more valves in the system, for example valves 820, and/or one or more pumps, such as solvent pumps provided downstream of the solvent reservoirs 108 and 802, to flow the appropriate amount of ingredient(s) and solvent(s) to the mixing area 811, or the final dispense chamber 107 of the device, to provide a fluid mixture.

The controller can also be programmed to control the interaction with the solvent cartridge 130. For example, the controller can be programmed to control the pump 801 and actuate it when solvent is needed in the system. The controller can also control the solvent routing mechanism, for example by actuating a plurality of valves to route the solvent in the desired direction.

A controller, as used in this disclosure, for example with reference to controller 810, can include one or more processors that can be distributed locally within the system or remotely. For example, one or more components of the system, such as valves, pumps, and sensors can be associated to individual microcontrollers that can control their operations and interaction with other components of the system. In specific embodiments of the invention, the controller can be a control system for the overall device even if the various control elements are separately programmed and are not part of a common control hierarchy. The controller can have access to one or more memories that store the instructions for the controllers. The memories can also store information for the system, such as a library of recipes, reference values, and any other necessary information such as sensor data and the like.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the methods disclosed herein can be executed by a processor in combination with a computer readable media storing instructions for the methods in combination with the other hardware elements described above. These and other modifications and variations to the present invention may be practiced by those skilled in the art, without departing from the scope of the present invention, which is more particularly set forth in the appended claims.

What is claimed is:

1. A fluid mixture dispensing device comprising:
   a solvent cartridge installed in a solvent cartridge slot of the fluid mixture dispensing device;
   a solvent chamber of the solvent cartridge, wherein the solvent chamber is exposed to atmospheric pressure;
   a filter assembly located in the solvent cartridge;
   a straw located in the solvent chamber and in air-tight fluid communication with the filter assembly along a line of air-tight fluid communication;
   a solvent cartridge interface;
   a sealed device interface on the solvent cartridge in air-tight fluid communication with both the filter assembly and the solvent cartridge interface along the line of air-tight fluid communication;
   a pump located in the fluid mixture dispensing device and configured to pump solvent from the solvent chamber through the line of air-tight fluid communication into the fluid mixture dispensing device; and
   a filter located in the filter assembly and positioned across the line of air-tight fluid communication.

2. The fluid mixture dispensing device of claim 1, further comprising:
   a cover of the solvent chamber; and
   a pressure relief opening in the cover of the solvent chamber;
   wherein the pressure relief opening exposes the solvent chamber to atmospheric pressure; and
   wherein the pump creates a pressure differential in the line of air-tight fluid communication to pump the solvent.

3. The fluid mixture dispensing device of claim 1, wherein the sealed device interface is configured to:
   form an air-tight connection with a cartridge interface on the fluid mixture dispensing device; and
   extend the line of air-tight fluid communication into the fluid mixture dispensing device through the air-tight connection.

4. The fluid mixture dispensing device of claim 1, further comprising:
   a removable cover of the solvent chamber;
   wherein the filter assembly is attached to the removable cover.

5. The fluid mixture dispensing device of claim 4, wherein:
   the sealed device interface is located on the removable cover of the solvent chamber.

6. The fluid mixture dispensing device of claim 4, wherein:
   a first end of the straw is attached to the filter assembly; and
   the straw is shaped so that, when the removable cover is attached to the solvent chamber, a second end of the straw reaches a bottom surface of the solvent chamber opposite to the removable cover.

7. The fluid mixture dispensing device of claim 4, wherein:
   the filter assembly is attached to the removable cover via a detachable connection;
   the detachable connection includes an o-ring; and
   the o-ring seals the detachable connection to provide the line of air-tight fluid communication.

8. The fluid mixture dispensing device of claim 4, wherein:
   the filter assembly includes a filter lid; and
   the filter lid includes: a first connection interface configured to attach to the removable cover of the solvent chamber; and a second connection interface configured to attach to the straw;
   wherein the first connection interface and the second connection interface are both air-tight connection interfaces and seal the line of air-tight fluid communication.

9. The fluid mixture dispensing device of claim 1, wherein:
   the straw is attached to the filter assembly via a detachable connection;
   the detachable connection includes a rubber gasket; and
   the rubber gasket seals the detachable connection to provide the line of air-tight fluid communication.

10. The fluid mixture dispensing device of claim 1, wherein:
    the filter is removable; and
    the filter assembly is adapted to receive a cleaning product tablet when the filter is removed.

11. The fluid mixture dispensing device of claim 1, further comprising:
    a cover of the solvent chamber;
    wherein the cover includes the sealed device interface.

12. The fluid mixture dispensing device of claim 1, further comprising:
    a placement interface of the solvent cartridge configured to match a placement interface of the fluid mixture dispensing device;
    wherein the placement interface of the solvent cartridge is configured to slide into the placement interface of the fluid mixture dispensing device.

13. The fluid mixture dispensing device of claim 12, further comprising:
    a cover;
    wherein the placement interface of the solvent cartridge is on the cover.

14. The fluid mixture dispensing device of claim 12, wherein:
the placement interface of the solvent cartridge is on at least one side of the solvent chamber.

15. A fluid mixture dispensing device comprising:
a removable solvent cartridge configured to slide into the fluid mixture dispensing device to form an air-tight connection with a cartridge interface on the fluid mixture dispensing device;
a solvent chamber of the removable solvent cartridge storing a solvent at atmospheric pressure;
a straw located in the solvent chamber and in air-tight fluid communication with the cartridge interface via the air-tight connection;
a pump located in the fluid mixture dispensing device and configured to pump solvent from the solvent chamber through the straw and the cartridge interface into the fluid mixture dispensing device; and
a filter located in the removable solvent cartridge between the straw and the air-tight connection.

16. The fluid mixture dispensing device of claim 15, wherein
removable solvent cartridge further comprises a sealed device interface configured to:
form an air-tight connection with a cartridge interface on the fluid mixture dispensing device; and
extend a line of air-tight fluid communication from the solvent chamber into the fluid mixture dispensing device through the air-tight connection.

17. The fluid mixture dispensing device of claim 15, further comprising:
a removable cover of the solvent chamber;
wherein the filter is attached to the removable cover.

* * * * *